US005569891A

United States Patent [19]
Freeman et al.

[11] Patent Number: 5,569,891
[45] Date of Patent: Oct. 29, 1996

[54] HIGH PERFORMANCE CIRCUIT BREAKER WITH INDEPENDENT POLE OPERATION LINKAGE AND CONICAL COMPOSITE BUSHINGS

[75] Inventors: Willie B. Freeman, Irwin; David S. Johnson; Jeffry R. Meyer, both of Greensburg, all of Pa.

[73] Assignee: ABB Power T&D Company, Inc., Raleigh, N.C.

[21] Appl. No.: 225,245

[22] Filed: Apr. 8, 1994

Related U.S. Application Data

[63] Continuation-in-part of Ser. No. 196,590, Feb. 11, 1994.
[51] Int. Cl.[6] .......................... H01H 33/12; H01H 33/46; H01H 33/53
[52] U.S. Cl. ...................... 200/17 R; 218/154; 218/155; 200/50.32
[58] Field of Search ..................... 200/17 R, 18, 200/50 R–50 C; 218/1, 2, 7, 8, 14, 43, 44, 68, 71, 78, 82, 84, 89, 92, 153, 154, 155

[56] References Cited

U.S. PATENT DOCUMENTS

| | | | |
|---|---|---|---|
| 2,967,221 | 1/1961 | Friedrich | 200/145 |
| 3,009,983 | 11/1961 | Oppel | 174/18 |
| 3,059,044 | 10/1962 | Friedrich et al. | 174/18 |
| 3,129,276 | 4/1964 | Easley et al. | 174/11 |
| 3,214,541 | 10/1965 | Baker et al. | 200/145 |

(List continued on next page.)

OTHER PUBLICATIONS

R. Gerald Colclaser, Jr.; Charles L. Wagner; Edward P. Donohue; Multistep Resistor Control of Switching Surges; *IEEE Transactions on Power Apparatus and Systems*, vol. PAS-88, No. 7, Jul. 1969.

John H. Brunke; Guenter G. Schockalt; *Synchronous Energization of Shunt Capacitors at 230 kV*; IEEE Power Engineering Society; Nov. 30, 1977.

R. W. Alexander; *Synchronous Closing Control for Shunt Capacitors*; IEEE Power Engineering Society; Dec. 19, 1984.

(List continued on next page.)

*Primary Examiner*—Brian W. Brown
*Assistant Examiner*—Michael A. Friedhofer
*Attorney, Agent, or Firm*—Woodcock Washburn Kurtz Mackiewicz & Norris

[57] ABSTRACT

The invention provides a high performance circuit breaker with an independent pole operation linkage and conical composite bushings. A mechanical linkage for independently opening and closing a plurality of associated switches is provided by the invention. The linkage comprises a plurality of connecting rods that provide the initial driving force to open or close the switch, cranks for opening and closing the contacts of respective switches, linking elements which couple together the connecting rods and the cranks, and a number of lever assemblies having a bearing ring interfaced thereto. The bearing rings provide a supportive interface between two linking element but permit the linking elements to rotate independently from one another. The lever assemblies also provide an interface for the connecting rods and linking element. According to a method of the present invention, a connecting rod is actuated in response to a signal to cause the lever assembly to pivot. The linking rod interfaced with the connecting rod via the lever assembly is then rotated in response to the pivoting. A crank interfaced with the linking element is then pivoted in response to the rotation of the linking element thereby opening or closing a respective switch. The invention further provide a means and method for synchronously opening and closing the switches based on the current flowing into the switches. Preferably, conical composite bushings are provided in combination with the independent pole operation linkage in a high voltage circuit breaker according to the invention.

10 Claims, 8 Drawing Sheets

U.S. PATENT DOCUMENTS

| | | | |
|---|---|---|---|
| 3,252,251 | 3/1966 | Floessel | 174/18 |
| 4,195,211 | 3/1980 | Aslan et al. | 200/401 |
| 4,306,263 | 12/1981 | Gray et al. | 361/3 |
| 4,357,502 | 11/1982 | Beck | 200/1 |
| 4,417,111 | 11/1983 | Kishi et al. | 218/44 |
| 4,442,329 | 4/1984 | Gray et al. | 218/71 |
| 4,505,033 | 3/1985 | Wheeler | 29/631 |
| 4,570,202 | 2/1986 | Nishida et al. | 361/333 |
| 4,775,849 | 10/1988 | Lucas | 336/90 |
| 4,814,560 | 3/1989 | Akesson | 218/84 |
| 4,833,278 | 5/1989 | Lambeth | 174/139 |
| 4,956,903 | 9/1990 | Thuries | 29/631 |
| 5,059,753 | 10/1991 | Hamm | 218/84 |
| 5,128,502 | 7/1992 | Hux | 200/145 |
| 5,170,885 | 12/1992 | Guenther et al. | 218/134 |
| 5,245,145 | 9/1993 | Freeman et al. | 218/143 |
| 5,262,605 | 11/1993 | Pham et al. | 218/143 |

OTHER PUBLICATIONS

Sue S. Mikhail; Mark F. McGranaghan; Evaluation of Switching Concerns Associated With 345 KV Shunt Capacitor Applications; *IEEE Transactions on Power Systems*, vol. PWRD–1, No. 2, Apr. 1986.

Robert A. Jones; Hoke S. Fortson, Jr.; Consideration of Phase–To–Phase Surges In The Application Of Capacitor Banks; *IEEE Transactions on Power Delivery*, vol. PWRD–1, No. 3, Jul. 1986.

G. Moraw; W. Richter; H. Hutegger; J. Wogerbauer; *Point–On–Wave Controlled Switching Of High Voltage Circuit–Breakers*; International Conference on Large High Voltage Electric Systems; Aug. 28–Sep. 3, 1988.

E. Andersen; S. Berneryd; S. Lindahl; *Synchronous Energizing Of Shunt Reactors And Shunt Capacitors*; International Conference on Large High Voltage Electric Systems; Aug. 28–Sep. 3, 1988.

J. R. Ribeiro; M. E. McCallum; An Application of Metal Oxide Surge Arresters In The Elimination Of Need For Closing Resistors In EHV Breakers; *IEEE Transactions on Power Delivery*, vol. 4, No. 1, Jan. 1989.

ABB Power T&D Company, Inc. Product Literature: "TTT7 Double Break Group–Operated Outdoor Disconnect Switches".

ABB Power T&D Company, Inc. Product Literature: "Type PM $SF_6$ Power Circuit Breaker".

B. J. Ware; J. G. Reckleff; G. Mauthe; G. Schett; *Synchronous Switching of Power Systems*; CIGRE, Aug. 26–Sep. 1, 1990.

A. Holm; R. Alvinsson; U. Akesson; O. Karlen; *Development of Controlled Switching of Reactors, Capacitors, Transformers and Lines*; CIGRE, Aug. 26–Sep. 1, 1990.

Victor Gor, Southern California Edison Co.; *Shunt Capacitor Bank Swithcing at 69KV, 115KV and 230KV*; EEI Electrical System Equipment Committee, Mar. 29–31, 1993.

"Evaluation of a New Protective Coating for Porcelain Insulators"; *IEEE Transactions on Power Apparatus and Systems*; vol. PAS–101; No. 12; Dec. 1982.

J. R. Meyer & E. P. Donohue, ABB Power T&D Company; M. A. Noyes & L. J. Savio, Consolidated Edison Company of New York, Inc.; "$SF_6$ Circuit Breaker Technology Advancements".

W. B. Freeman & K. Froehlich, ABB Power T&D Company, Inc.; B. Fluri, Cellpack Ltd.; "Application of RTV–Composite Insulation to High Voltage Bushings".

ABB Power T&D Company, Inc. Product Literature: "Vertical–Break Group–Operated Outdoor Disconnect Switches".

ABB Power T&D Company, Inc. Product Literature: "Type PM Dead Tank".

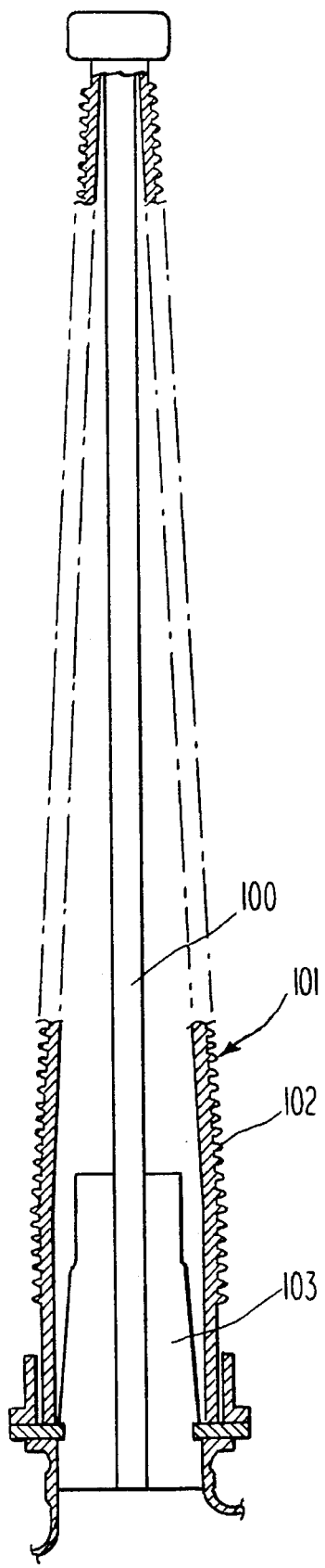
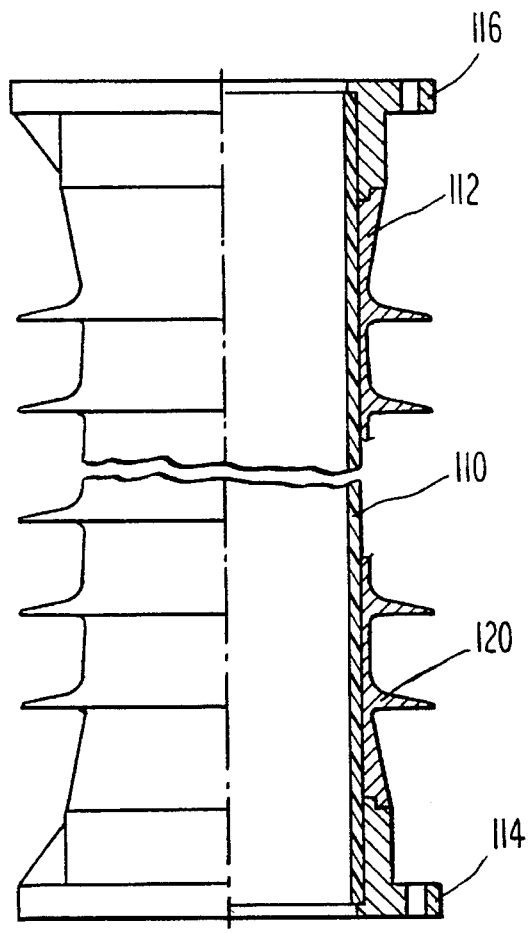
Fig. 1B (PRIOR ART)
(PRIOR ART)
Fig. 1C

HIGH PERFORMANCE CIRCUIT BREAKER WITH INDEPENDENT POLE OPERATION LINKAGE AND CONICAL COMPOSITE BUSHINGS

RELATED APPLICATION DATA

This application is a continuation-in-part of Ser. No. 08/196,590, filed on Feb. 11, 1994.

FIELD OF THE INVENTION

The present invention relates generally to electrical switching devices. More particularly, the invention relates to a synchronous independent pole operation linkage for use in a high voltage alternating current circuit breaker.

BACKGROUND OF THE INVENTION

A preferred application for the present invention is in high voltage alternating current (AC) three phase circuit breakers and reclosers, the latter being a type of circuit breaker. Therefore, the background of the invention is described below in connection with such devices. However, it should be noted that, except where they are expressly so limited, the claims at the end of this specification are not intended to be limited to applications of the invention in a high voltage three phase AC circuit breaker.

A high voltage circuit breaker is a device used in the distribution of three phase electrical energy. When a sensor or protective relay detects a fault or other system disturbance on the protected circuit, the circuit breaker operates to physically separate current-carrying contacts in each of the three phases by opening the circuit to prevent the continued flow of current. A recloser differs from a circuit breaker in that a circuit breaker opens a circuit and maintains the circuit in the open position indefinitely, whereas a recloser may automatically open and reclose the circuit several times in quick succession to allow a temporary fault to clear and thus, avoid taking the circuit out of service unnecessarily.

The major components of a circuit breaker or recloser include the interrupters, which function to open and close one or more sets of current carrying contacts housed therein; the operating or driving mechanism, which provides the energy necessary to open or close the contacts; the arcing control mechanism and interrupting media, which create an open condition in the protected circuit; one or more tanks for housing the interrupters; and the bushings, which carry the high voltage electrical energy from the protected circuit into and out of the tank(s). In addition, a mechanical linkage connects the interrupters and the operating mechanism.

Circuit breakers may differ in the overall configuration of these components. However, the operation of most circuit breakers is substantially the same regardless of their configurations. For example, a circuit breaker may include a single tank assembly which houses all of the interrupters. U.S. Pat. No. 4,442,329, Apr. 10, 1984, "Dead Tank Housing for High Voltage Circuit Breaker Employing Puffer Interrupters," discloses an example of the single tank configuration. Alternatively, a separate tank for each interrupter may be provided in a multiple tank configuration. An example of a multiple tank configuration is depicted in FIG. 1.

As shown in FIG. 1, a prior art circuit breaker assembly 1 includes three cylindrical metal tanks 3. The three cylindrical tanks 3 form a common tank assembly 4 which is preferably filled with an inert, electrically insulating gas such as $SF_6$. The tank assembly 4 shown in FIG. 1 is referred to as a "dead tank" in that it is at ground potential. Each tank 3 houses an interrupter (not shown in FIG. 1). The operation of an interrupter is described below. The interrupters are provided with terminals which are connected to respective spaced bushing insulators. The bushing insulators are shown as bushing insulators 5a and 6a for the first phase; 5b and 6b for the second phase; and 5c and 6c for the third phase. Associated with each pole or phase is a current transformer 7.

$SF_6$ breaker bushings are an integral part of the breaker, both electrically and mechanically. They are not designed or used as general purpose apparatus bushings. $SF_6$ breaker bushings are designed to support and insulate high voltage line connections and carry power into the grounded tank of the circuit breaker.

In high voltage circuit breakers, the pairs of bushings for each phase are often mounted so that their ends have a greater spacing than their bases to avoid breakdown between the exposed conductive ends of the bushings. One means for achieving the desired spacing has been to use conical bushings such that the terminal ends of the bushings have smaller diameters than their respective bases. For example, FIG. 1A shows a high voltage circuit breaker with conical bushings 90a–c and 92a–c. The conical bushings are angled away from each other to provide an adequate air gap (AG) between their ends so that in the event of a flashover or significant current leakage, the resulting breakdown is grounded in the dead tank. Therefore, it is desirable that the spacing between the terminal portions of the bushings, i.e., air gap, be greater than the length of the bushing. As circuit breakers become more compact, the size and spacing of the bushings become a critical design feature of the circuit breaker.

A longitudinal cross section of a typical conical bushing is shown in FIG. 1B. A high voltage conductor 100 is surrounded by an insulator 101 with weather sheds 102. The conductor 100 is electrically coupled between an interrupter and the protected circuit. The insulator 101 of the $SF_6$ breaker bushing is shaped and sized to accommodate an internal grading shield 103 which optimizes dielectric strength (internally and externally). The shield 103 is uniquely shaped to grade the voltage field in the air along the exterior length of the bushing as well as inside where the bushing conductor 100 enters the grounded tank. The bushing conductor 100, running through the hollow, $SF_6$-filled insulator 101, creates a radial stress through the bushing. This stress is higher at the entrance to the grounded tank. Therefore, the shield 103 reduces the stress on the insulator to improve the reliability of the bushing. The weather sheds 102 on the external surface of the bushing resist the effects of rain and surface dirt to maintain good dielectric conditions.

Traditionally, bushing insulators have been made from porcelain or a cast epoxy. Typically, the weather sheds are designed so that water rolls off the sheds keeping the underside of the sheds substantially dry. However a significant portion of the insulator surface can become wet or degraded by environmental pollution. The resulting weakening of the dielectric can cause leakage and flashover conditions.

An additional drawback of porcelain or cast epoxy bushings is that they are relatively brittle and, therefore, subject to damage from external condition that can cause them to shatter so that the $SF_6$ contained therein explodes. To provide an optimal insulator and a safe and reliable housing for the bushing conductor, the porcelain and cast epoxy insulators are produced with a relatively thick wall (i.e., about 1 inch). The increased thickness further narrows the air gap, increases the weight of the bushings, and increases the cost of the bushings.

Therefore, a composite bushing has been developed that provides the following advantages over traditional bushings: non-brittle behavior, reduced weight and wall thickness, pollution resistance, and improved wet electrical capability. A longitudinal cross section of a composite bushing is shown in FIG. 1C. Composite bushings insulators are made up of a fiberglass reinforced tube 110 protected by a silicone rubber housing 112. These bushings have a straight cylindrical composite tube with aluminum end flanges 114 and 116 and room temperature, vulcanized (RTV) silicone rubber weather sheds 120. The RTV silicone rubber has a hydrophobic surface due to oil films that naturally form on the rubber surface.

The composite bushings are produced by using an injection molding technique in which the a single mold forms a single section of the housing 112 at a time. This process is both time consuming and relatively inefficient in that each section of the housing must also be molded together to form the completed bushing housing. Since the silicone rubber housing is formed from a injection molding process, a specially designed mold would be required to produce the desired conical shape. For many high voltage breakers that require very large bushings, such molds are impractical.

A process for molding rubber using a traveling mold has been commercially exploited. Essentially, the traveling mold is capable of forming plastic or rubber on substantially any shape in a continuous process. Therefore, to improve the performance and reduce the size and weight of high voltage circuit breakers there is a need to design a conical composite bushing that has a housing which can be formed using such a traveling mold.

Two other important elements of a high voltage circuit breaker are the operating mechanism and a mechanical linkage. The operating mechanism that provides the necessary operating forces for opening and closing the interrupter contacts is contained within an operating mechanism housing 9 shown in FIGS. 1 and 1A. The operating mechanism is mechanically coupled to each of the interrupters via a linkage 8.

A cross section of an interrupter 10 is shown in FIGS. 2A–C. The interrupter provides two sets of contacts, the arcing contacts 12 and 14 and the main contacts 15 and 19. Arcing contacts 12 and main contacts 19 are movable, as described in more detail below, to either close the circuit with respective contacts 14 and 15 or to open the circuit. FIG. 2A shows a cross sectional view of the interrupter with its contacts closed, whereas FIG. 2C shows a cross section of the interrupter with the contacts open.

The arcing contacts 12 and 19 of high voltage circuit breaker interrupters are subject to arcing or corona discharge when they are opened or closed, respectively. As shown in FIG. 2B, an arc 16 is formed between arcing contacts 12 and 14 as they are moved apart. Such arcing can cause the contacts to erode and perhaps to disintegrate over time. Therefore, a known practice (used in a "puffer" interrupter) is to fill a cavity of the interrupter with an inert, electrically insulating gas that quenches the arc 16. As shown in FIG. 2B, the gas is compressed by piston 17 and a jet or nozzle 18 is positioned so that, at the proper moment, a blast of the compressed gas is directed toward the location of the arc in order to extinguish it. Once an arc has formed, it is extremely difficult to extinguish it until the arc current is substantially reduced. Once the arc is extinguished as shown in FIG. 2C, the protected circuit is opened thereby preventing current flow.

Typically a bank of shunt capacitors is coupled between the arcing contacts to control the arcing by equalizing the voltages at the respective breaks in a multi-interrupting point type circuit breaker, i.e., one with more than one set of contacts. A capacitor coupled between contacts may also be used in a single-break circuit breaker. The bank of shunt capacitors is typically arranged within a dead tank to surround an arc-extinguishing chamber therein. It is further known to control arcing utilizing pre-insertion or closing resistors, as disclosed in U.S. Pat. No. 5,245,145, Sep. 14, 1993, "Modular Closing Resistor" (assigned to ABB Power T&D Company Inc.).

Voltage and current transients generated during the energization of shunt capacitor banks have become an increasing concern for the electric utility industry in terms of power quality for voltage-sensitive loads and excessive stresses on power system equipment. For example, modern digital equipment requires a stable source of power. Moreover, computers, microwave ovens and other electronic appliances are prone to failures resulting from such transients. Even minor transients can cause the power waveform to skew, rendering these electrical devices inoperative. Therefore, utilities have set objectives to reduce the occurrence of transients and to provide a stable power waveform.

Conventional solutions for reducing the transients resulting from shunt capacitor energization include circuit breaker pre-insertion devices, for example, resistors or inductors, and fixed devices such as current limiting reactors. While these solutions provide varying degrees of mitigation for capacitor bank energization transients, they result in added equipment, added cost, and can result in added reliability concerns.

The maximum shunt capacitor bank energization transients are associated with closing the circuit breaker at the peak of the system voltage waveform, i.e., where the greatest difference exists between the bus voltage, which will be at its maximum, and the capacitor bank voltage, which will be at a zero level. Where the closings are not synchronized with respect to the system voltage, the probability for obtaining the maximum energization transients is high. One solution to this problem is to add timing accuracy to synchronously close the circuit breaker at the instant the system voltage is substantially zero. In this way, the voltages on both sides of the circuit breaker at the instant of closure would be nearly equal, allowing for an effectively "transient-free" energization.

While the concept of synchronous or zero-crossing closing is a simple one, a cost-effective solution has been difficult to achieve, primarily due to the high cost of providing the required timing accuracy in a mechanical system. U.S. Pat. No. 4,306,263, Dec. 15, 1981, entitled "Synchronous Closing System and Latch Therefor," discloses a synchronous closing system wherein the circuit breaker main contacts close within about 1 millisecond of a zero crossing by inhibiting the hydraulic pressure utilized to close the interrupter contacts using a latch controlled mechanism. However, this synchronous closing system is incapable of providing synchronization for each phase or pole individually. Thus, while one phase may be closed synchronously, avoiding transients in that phase of the circuit, harmful transients may be produced by closing the contacts in one or both of the other phases.

One solution might be to utilize three separate operating mechanisms and corresponding linkages to synchronously control the operation of each pole individually. U.S. Pat. No. 4,417,111, Nov. 22, 1983, entitled "Three-Phase Combined Type Circuit Breaker," discloses a circuit breaker having a separate operating mechanism and associated linkage for each of the three phases or poles. However the use of three separate operating mechanisms and associated linkages is expensive and increases the overall size and complexity of the circuit breaker.

U.S. Pat. No. 4,814,560, Mar. 21, 1989, "High Voltage Circuit Breaker" (assigned to Asea Brown Boveri AB, Vasteras, Sweden) discloses a device for synchronously closing and opening a three-phase high voltage circuit breaker so that a time shift between the instants of contact in the different phases can be brought about mechanically by a suitable choice of arms and links in the mechanical linkage. This linkage uses an a priori knowledge of the time required to close and open the interrupter contacts in each of the three phases. The time differences can be accounted for by an appropriate design of the mechanical linkage. However, such a linkage cannot support dynamic monitoring of the zero-crossings for each phase to achieve independent synchronization. Moreover, the mechanical linkage disclosed would require mechanical adjustments over time to account for variations in the circuit breaker performance and operating conditions which often change over time.

A dependent pole operating mechanism has been used in circuit breakers to generate the initial driving forces required to open and close the interrupter contacts. Dependent pole operation refers to the limited capability of the operating mechanism to close or open all three phases of the circuit simultaneously. A prior art example of a dependent pole mechanism and mechanical linkage implemented in a three-phase circuit breaker is shown in FIG. 3. As shown in FIG. 3, operating mechanism 20 provides a single connecting rod 22. Connecting rod 22 is interfaced with linking element 26 via lever 24. Linking elements 25 and 26 preferably form a single linking shaft linking together the terminal portions of each of the three interrupters (not shown in FIG. 3). In operation, the connecting rod 22 is driven up or down thereby pivoting lever 24. As lever 24 pivots, the linking elements 25 and 26 rotate. The linking elements are preferably coupled to bell cranks provided in the terminal portion of the interrupters (not shown in FIG. 3) which pivot in response to the rotation of the linking elements to open and close the contacts of the interrupters. It should be understood that each of the interrupters housed in tanks 3 will open and close simultaneously in response to the movement of connecting rod 22.

Recently an independent pole operating mechanism has been developed which provides an individually controlled driving force for opening and closing each phase of the circuit breaker independently. By utilizing the independent pole operating mechanism, each phase can be dynamically and synchronously switched individually. Thus there is a need to provide a mechanical linkage to operate effectively with the independent pole operating mechanism. To eliminate the necessity of redesigning the entire circuit breaker to implement the new independent pole operating mechanism, it is desirable to cost-effectively adapt existing circuit breaker linkages, such as linkage 8 shown in FIG. 1. Moreover, the mechanical linkage for use with the independent pole operating mechanism should not increase the size of the circuit breaker, or require complex assembly or maintenance steps to ensure that the circuit breaker functions properly.

SUMMARY OF THE INVENTION

The present invention fulfills these needs by providing a mechanical linkage for independently opening and closing a plurality of associated switches. According to the invention the mechanical linkage comprises a plurality of linking elements, and a decoupling means for rotationally decoupling and supporting the linking elements at an interface between the linking elements. A plurality of connecting rods extending from a driving mechanism are operatively coupled to the linking elements. The driving mechanism actuates connecting rods to cause the linking elements to open and close the plurality of switches. In a preferred embodiment, the decoupling means comprises a number of lever assemblies for pivotally coupling one of the connecting rods with one of the linking elements to operatively rotate the linking element, and a number of bearing means for providing a supporting link at an interface between two of the linking elements so that the two linking elements are rotationally decoupled from one another at the interface therebetween.

A three-phase circuit breaker is also provided according to the invention for opening and closing a circuit connected thereto. In a preferred embodiment, the three-phase circuit breaker comprises a number of interrupting means; a linking mechanism comprising a plurality of linking elements, and a decoupling means for rotationally decoupling and supporting the linking elements at an interface between the linking elements; and a driving means having at least two connecting rods mechanically interfaced with the linking elements so that the linking elements rotate independently with respect to each other to open and close associated phases of the circuit. The linking mechanism preferably comprises at least two lever assemblies for mechanically interfacing one connecting rod with one linking element; and at least two bearing means capable of providing a supportive interface for two of the linking elements. The driving means is preferably an operating mechanism having a three-phase independent pole operation capability. In a more preferable embodiment, the circuit breaker is opened and closed synchronously with AC current flowing into the interrupters.

A method for controlling the opening and closing of a plurality of associated switches is also provided to fulfill the above-identified needs. The inventive method comprises the steps of receiving a signal to initiate the switching of one of the switches to open or to close; actuating a connecting rod interfaced with one linking element to generate an independent movement of the linking element with respect to other linking elements in response to the signal; and switching the switch open or closed in response to the independent movement of the linking element. In a preferred embodiment, a crank which is operatively coupled between a linking element and a switch is pivoted in response to the independent movement of the linking element so that the switch is switched open or closed in accordance with the received signal. In a further preferred embodiment, the interface between the connecting rod and the linking element is provided by a lever. In this preferred embodiment, the lever is pivoted in response to actuating the connecting rod and the linking element is rotated in response to the pivoting. The interface between the connecting rod and the linking element is preferably periodically adjusted to ensure that the lever pivots sufficiently to open and close the switch.

A three phase independent pole operation circuit breaker comprising: a number of switches where each switch is associated with one of the phases of a protected circuit and operatively interfaced with the circuit to form a high voltage interface; an independent pole operation linkage mechanically connected to each switch and being capable of independently opening or closing each switch based on a condition of the protected circuit; and at least one composite bushing interfaced with the protected circuit and interfaced with each switch for insulating the high voltage interface. In a preferred embodiment, the composite bushing has a conical shape with a plurality of weather sheds forming a helix thereon.

In a more preferred embodiment, composite bushing comprises: a hollow conical tube for containing a gas within the bushing; and an insulative housing having a plurality of weather sheds and substantially covering the hollow conical tube. The hollow conical tube is preferably made of a fiber reinforced epoxy material and the housing is preferably made of silicone rubber.

In another preferred embodiment, the switches are opened and closed synchronously with AC current flowing in each of the phases of the protected circuit.

BRIEF DESCRIPTION OF THE DRAWINGS

The present invention will be better understood and its numerous objects and advantages will become apparent by reference to the following detailed description of preferred embodiments when taken in conjunction with the following drawings, in which:

FIG. 1B is a longitudinal cross section of a conical bushing according to the prior art;

FIG. 1C is a longitudinal partial cross section of a cylindrical composite bushing;

DETAILED DESCRIPTION OF PREFERRED EMBODIMENTS

Figure 4:
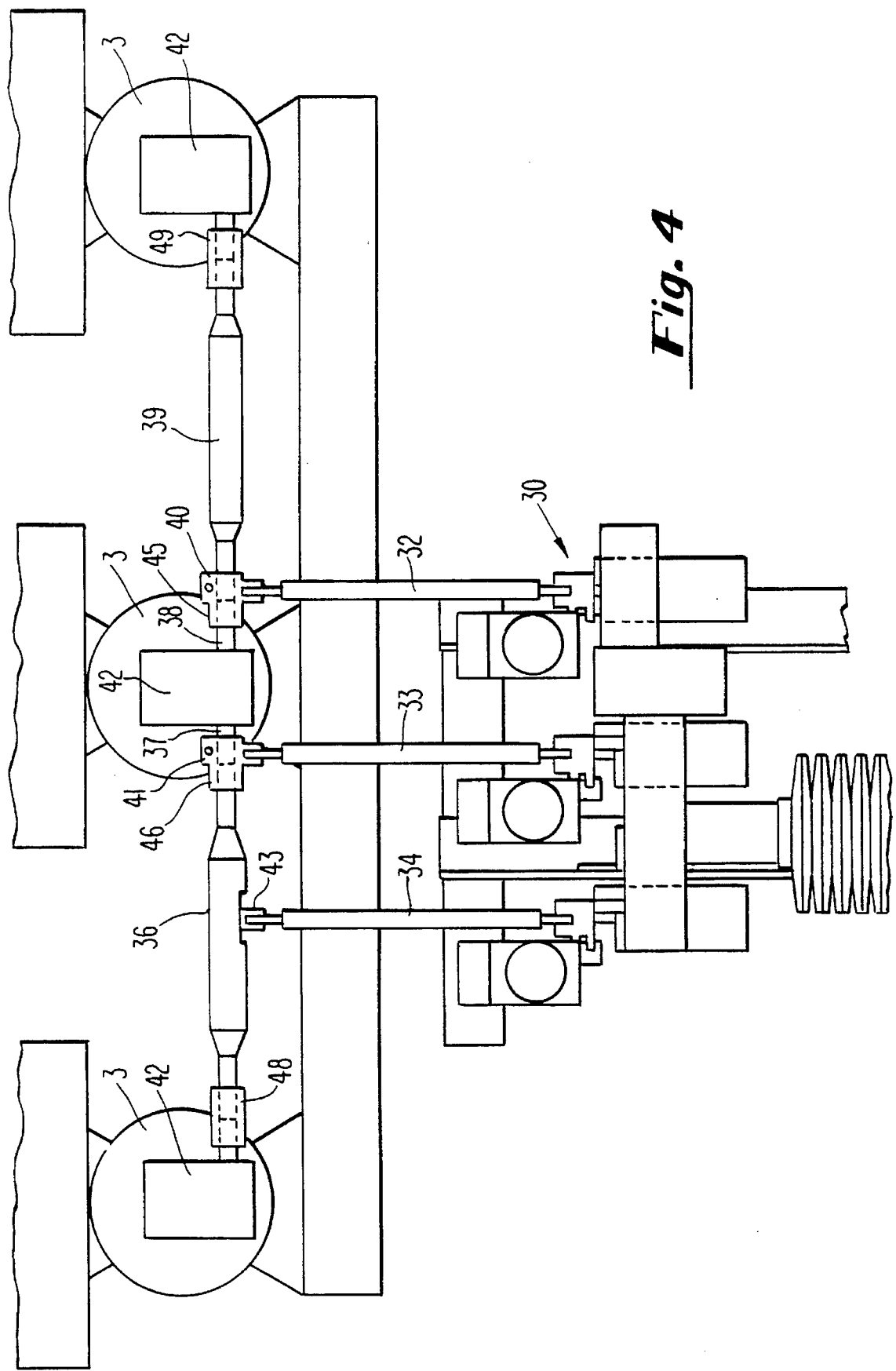
FIG. 4 is a diagram of an independent pole operation linkage in accordance with the invention.

A diagram of a linkage for use in a three-phase circuit breaker according to the invention is shown FIG. 4. The operating mechanism 30 preferably provides three independently operated connecting rods 32, 33 and 34. The linkage comprises four link elements 36, 37, 38 and 39. It should be understood that in a preferred embodiment, link elements 37 and 38 form a single linking shaft. Two lever assemblies 40 and 41 provide mechanical interfaces for coupling connecting rod 32 with link element 39 and for coupling connecting rod 33 with link element 37, respectively. Lever assemblies 40 and 41 also provide a mechanical interface to bearing rings 45 and 46 respectively. Connecting rod 34 is mechanically interfaced with link element 36 via lever 43 which does not have a mechanical interface to a bearing ring. Bearing rings 45 and 46 provide a supportive link between link elements 38 and 39 and between link elements 36 and 37, respectively. These supportive links permit each of the linking elements to rotate independently from each other, as described below.

Figure 5:
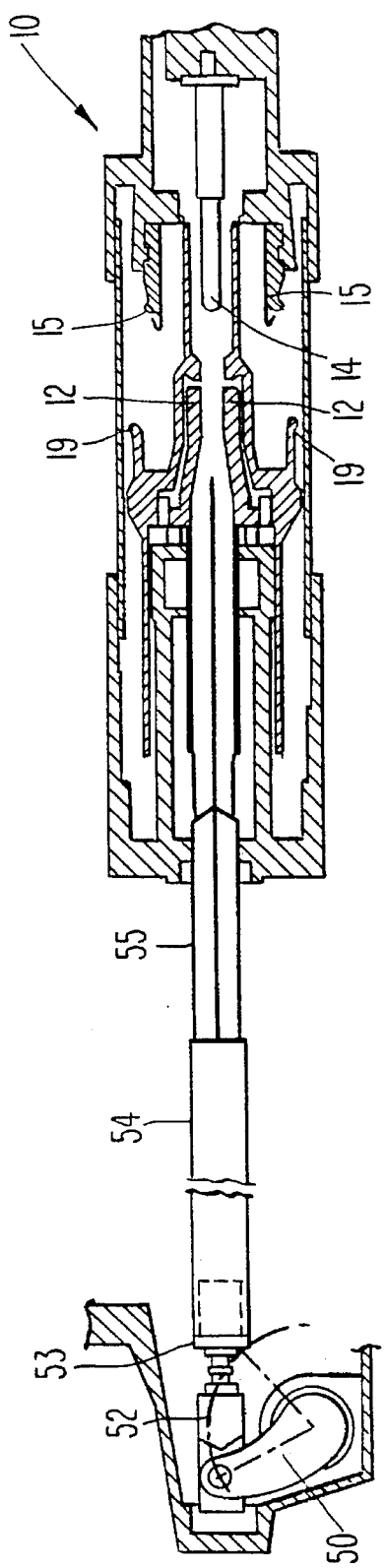
FIG. 5 is a cross sectional view of an interrupter with a bell crank coupling.

Each link element is coupled to a bell crank (not shown in FIG. 4) located within the terminal portion 42 of the interrupter shown within tank 3 in FIG. 4. FIG. 5 shows an axial cross sectional view of an interrupter. A bell crank 50 is shown in the terminal portion of the interrupter. When the bell crank 50 is pivoted in the direction indicated by the dash-and-dot lines, the insulating rod 52 is pivoted into the guide tube 54 causing a piston member 53 to close the interrupter's contacts, i.e. movable contacts 12 and 19 so that they engage fixed contacts 14 and 15, respectively. The link elements 36 and 39 (FIG. 4) are preferably coupled to bell crank shafts 48 and 49 respectively with a clamp or other suitable means. Link elements 37 and 38 are preferably bell crank shafts coupled to a common bell crank.

To close one pole or phase of the protected circuit, the operating mechanism 30 drives the appropriate connecting rod 32, 33, or 34 upward. For instance, if it were desired to close the contacts of the interrupter located within the center tank 3 shown in FIG. 4, connecting rod 33 would be extended upward. The upward motion of connecting rod 33 pivotally rotates lever assembly 41 causing link element 37 to rotate about its axis in a clockwise direction as shown. Link elements 37 and 38 are coupled via splining or an equivalent method to bell crank 50 (FIG. 5). Bell crank 50 preferably has two lateral faces (one is shown in FIG. 5) so that link element 37 is coupled to one lateral face and link element 38 is coupled to the other lateral face. Thus, as link element 37 rotates, bell crank 50 pivots along the dash-and-dot line in FIG. 5 to close the interrupter's contacts.

Typically a utility which maintains the protected circuit monitors fault conditions on the circuit. If a fault condition is detected a control signal is output to the circuit breaker to cause the operating mechanism to close the appropriate contacts. Manual switches may also be provided for generating similar signals to initiate the opening or closing of the contacts. The operating mechanism 30 in response to such signals releases the appropriate connecting rod 32, 33 or 34. For instance, to open the phase of the circuit associated with the center interrupter shown in FIG. 4, connecting rod 33 is pulled in a downward motion. Lever assembly 41 pivots causing link element 37 to rotate in a counter clockwise direction. The counterclockwise rotation of link element 37 in turn causes bell crank 50 to pivot away from the interrupter's contacts along the dash-and-dot line to open up the contacts.

It should be understood that the size of the connecting rods, linking elements, and bell cranks, as well as the pivot angle of the bell crank should be considered to determine the angle through which the lever assemblies 40 and 41 and lever 43 must rotate to properly open and close the contacts. One advantage of the linkage design according to the invention is that the linkage is easily assembled for independent phase operation by adjusting the joints (the lever assembly/linking element interfaces and the lever 43 interface with link element 36 define the joints) to achieve the required angle of rotation. Thus only one adjustment is required for each operational phase of the circuit. Other linkages, e.g., linear linkages, can require as many as five adjustments per phase.

Figure 6:
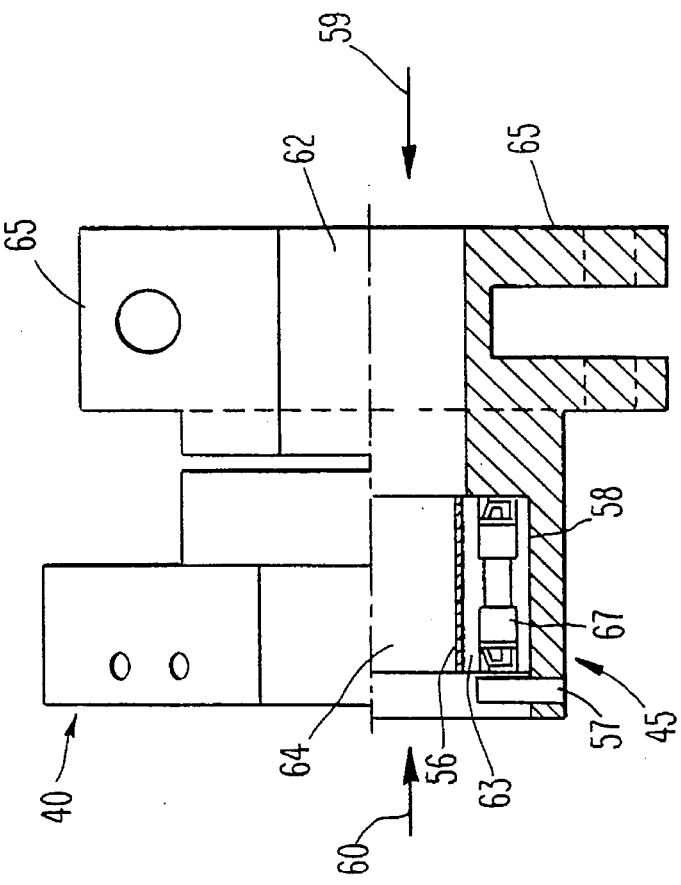
FIG. 6 is an enlarged view with a partial cross sectional view of the lever assembly and bearing ring according to the present invention.

FIG. 6 shows an enlarged view of lever assembly 40 with the portion below the dash-and-dot line showing a cross section of the lever 65 and bearing 45. As shown in the figure, link element 39 can be inserted through an aperture 62 in lever 65 in the direction indicated by arrow 59. The link element 39 may be mechanically coupled to lever 65 via any suitable method such as splining, pinning, bolting or the like. Lever 65 also provides the outer shell 58 of the bearing ring (reference numeral 45 in FIG. 4). Therefore, lever 65 also provides a hollow opening 63 in which the individual bearings 67 can be inserted to form the bearing ring with an inner aperture 64. Link element 38 can be inserted through aperture 64 in the direction of arrow 60. Thus the bearing ring 45 forms a supportive link between link elements 38 and 39. In a more preferred embodiment, a sleeve 56 lines the aperture 64 and serves as a spacer so that standard sized bearings may be used in the lever assembly. A spring pin 57 or the equivalent thereof may be projected through the lever assembly 40 as shown to secure the bearings 67 within the hollow opening 63.

Figure 1:
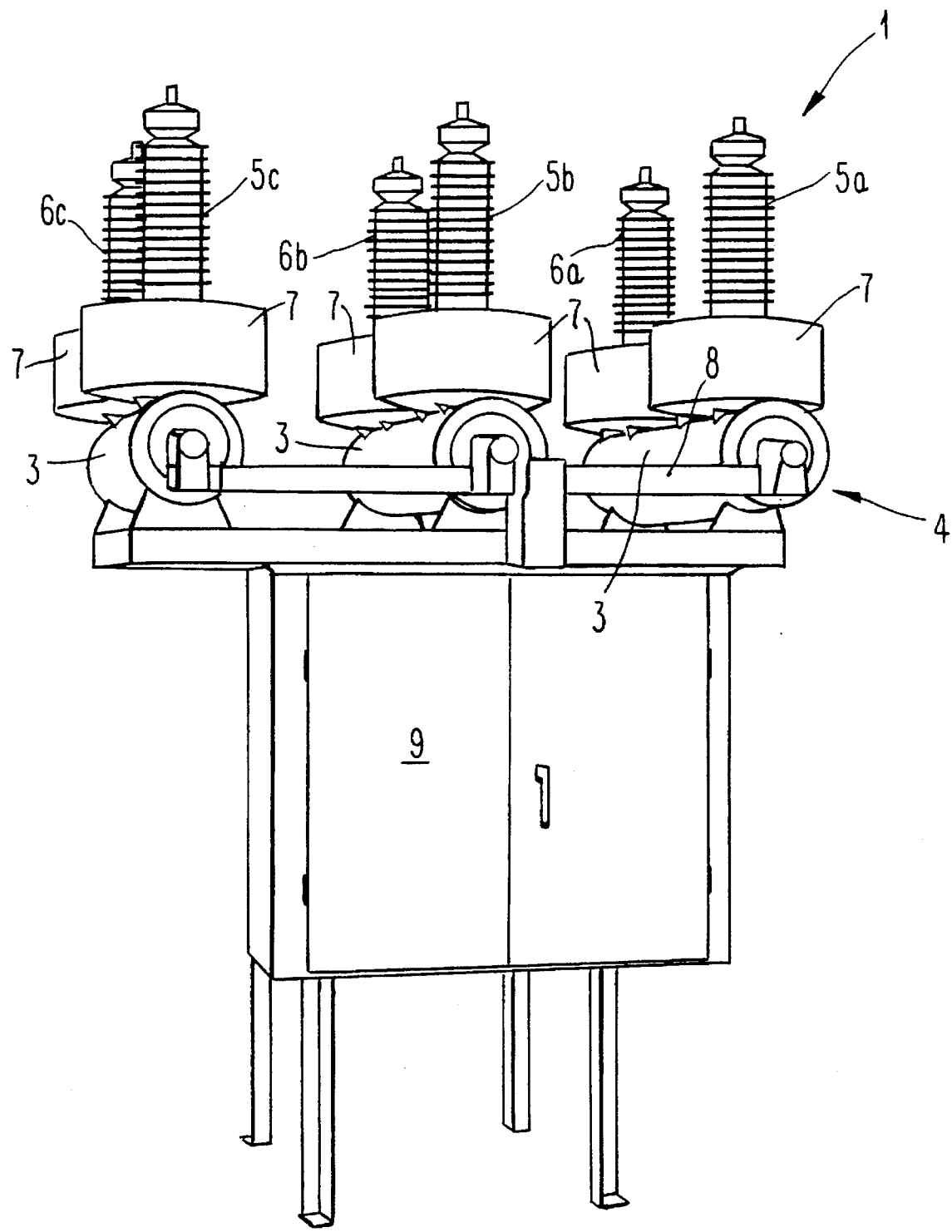
FIG. 1 is a diagram of a prior art multiple tank high voltage circuit breaker.
Figure 1A:
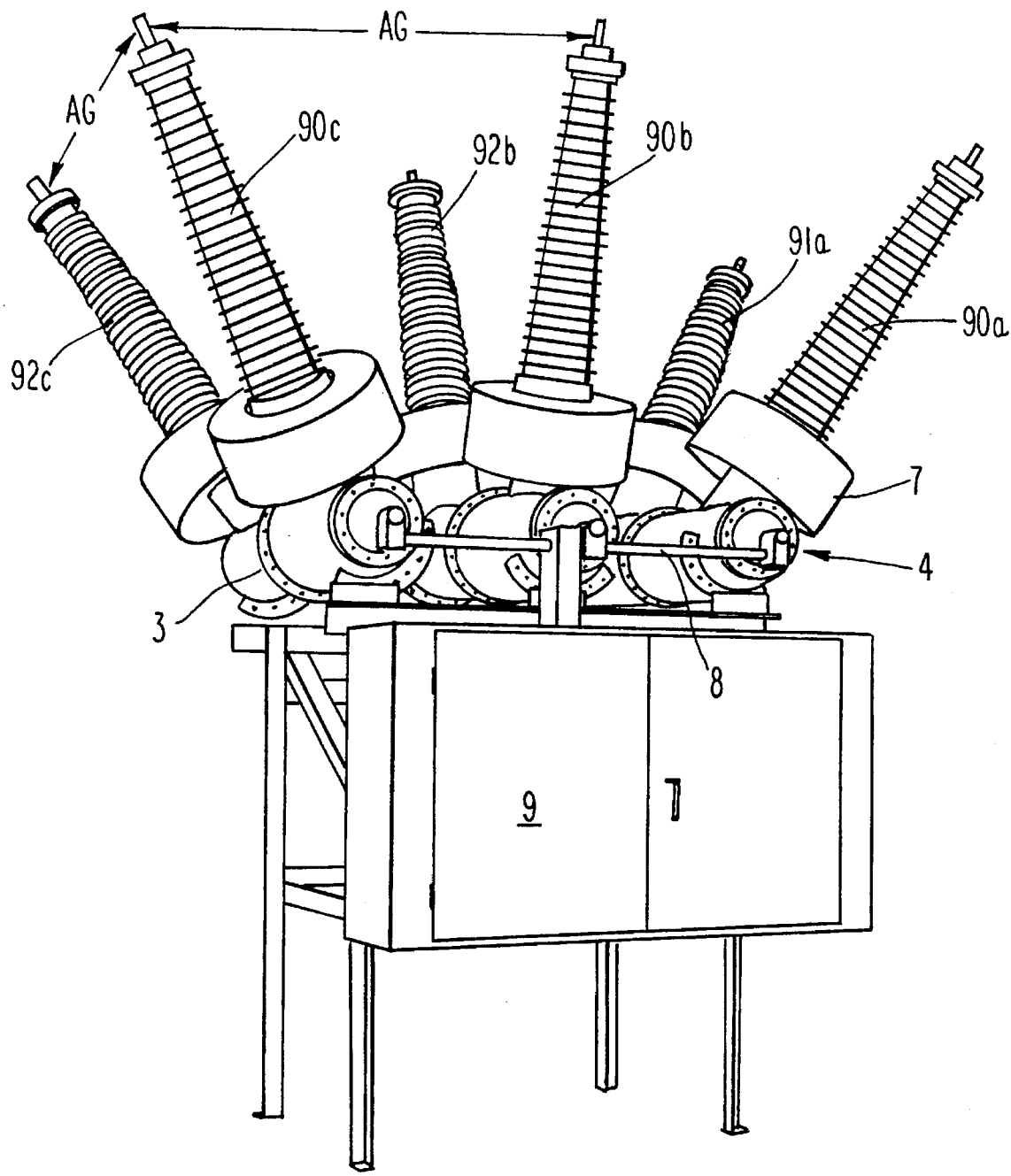
FIG. 1A is a diagram of a high voltage circuit breaker having conical bushings arranged in an angular configuration.
Figure 2A:
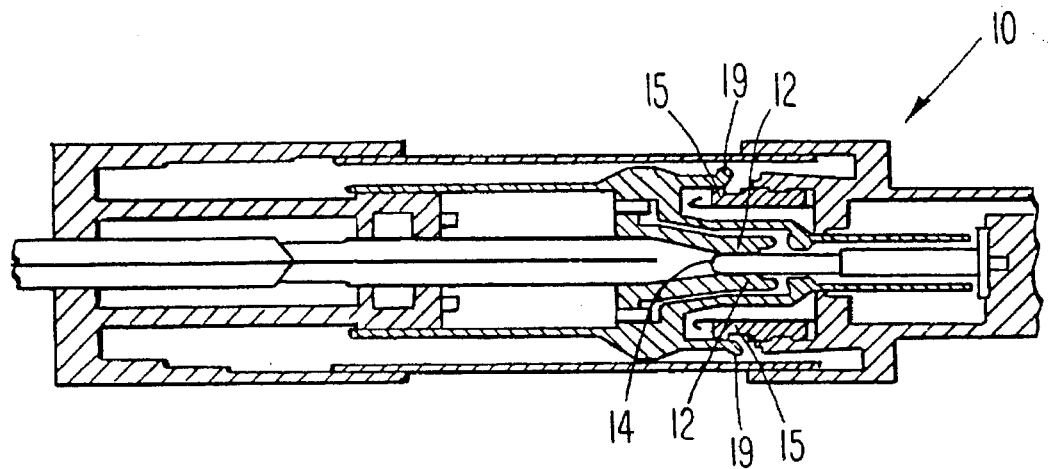
FIG. 2A is a cross sectional view of a prior art interrupter with its contacts closed.
Figure 2B:
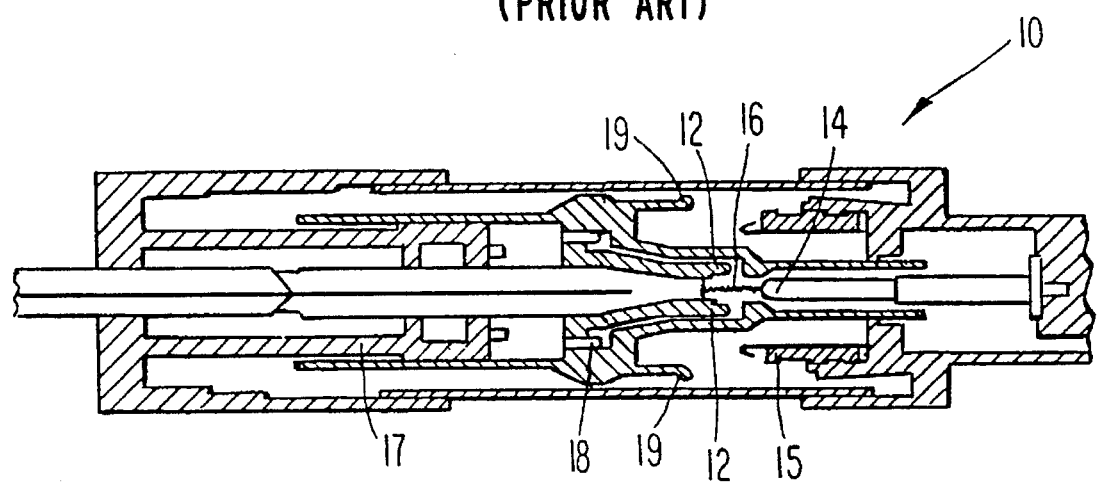
FIG. 2B is a cross sectional view of a prior art interrupter with an arc formed between its arcing contacts.
Figure 2C:
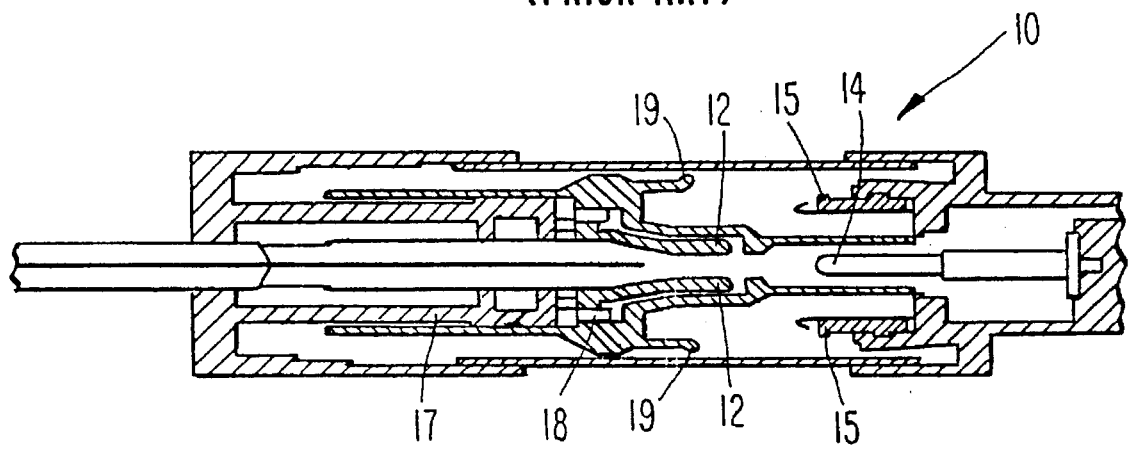
FIG. 2C is a cross sectional view of a prior art interrupter with its contacts open.
Figure 3:
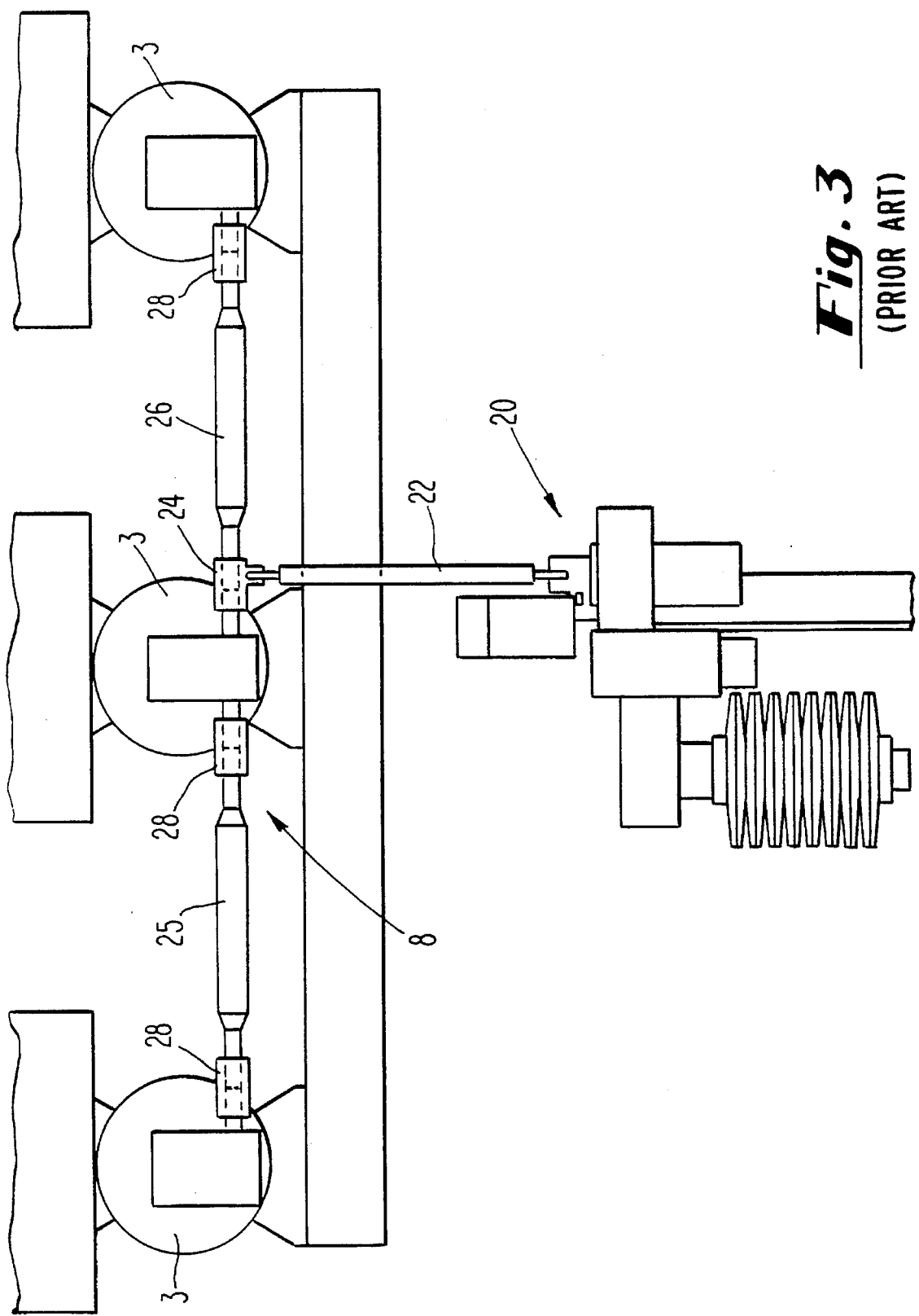
FIG. 3 is a diagram of a prior art a dependent pole operation linkage according to the present invention.

The linkage according to the present invention provides numerous advantages for independent phase operation in a circuit breaker. Significantly the standard size linkage as shown for instance in FIG. 3 can be adapted rather than completely redesigned to accommodate independent pole operation. For example, lever assemblies and bearing rings can be added to rotationally decouple the linking elements 25 and 26 of the dependent pole linkage 8 to provide an independent phase operation capability. It should, therefore, be evident that the linkage according to the present invention is substantially the same size as the dependent pole linkage so that existing circuit breaker hardware can be used with the independent pole operation linkage. Moreover, the linkage according to the present invention does not increase the size of the circuit breaker to achieve independent pole operation.

Figure 7:
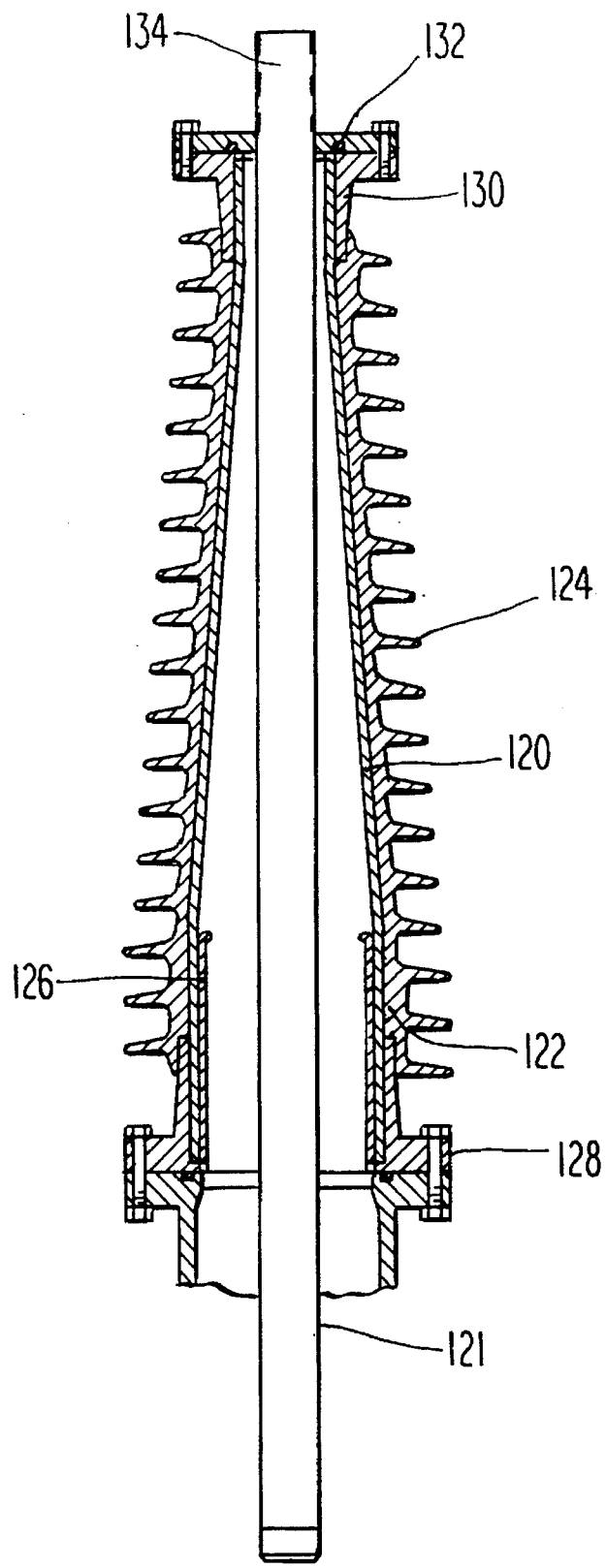
FIG. 7 is longitudinal cross-section of a conical composite bushing according to the present invention.

FIG. 7 is a longitudinal cross section of a conical composite bushing according to the present invention. A conical fiber reinforced tube (FRP) 120 surrounding the bushing conductor 121 is formed from an epoxy resin or polyester material which has been reinforced with a strong fibrous material such as fiberglass, polyesters, aramids, or cloth threads. The traveling mold described above is used to form an insulative housing 122 having weather sheds 124 of silicone rubber or a similar rubber material such as ethylene propylene on the surface of the conical FRP tube 120. The weather sheds 124 preferably form a helix along the bushing surface. A grading shield 126 is attached to the inner surface of the FRP tube 120 and mounting flange 128 as shown in FIG. 7. A top flange 130 secures an 0-ring 132 to the bushing. A line terminal 134 from the protected circuit is electrically interfaced to the bushing conductor 121 at the 0-ring 132.

The performance of an independent pole operation circuit breaker can be further improved by replacing conventional bushings with the conical composite bushings. Not only do the composite bushings repel pollution and water, resist shattering or exploding, reduce size and weight of the breakers, but they can additionally improve the breaker's overall reliability in other ways. For instance, if any of the bushings fail in conventional dependent pole operating circuit breaker, the entire circuit breaker must be shut down. However, in a independent pole operating circuit breaker only the phase associated with a faulty bushing need be opened. When conical composite bushings are utilized with an independent pole operation linkage the need to shut down any of the phases is further reduced by the superior attributes of the conical composite bushings.

Moreover, in conventional synchronous closing breakers, leakage in any one of the bushings can result in altering the timing of the closing or opening of the circuit. In an independent pole synchronous closing circuit breaker, leakage in one bushing should not affect the remaining phase. However, minimizing leakage using the conical composite bushings also improves the reliability of an independent pole synchronous closing circuit breaker since even small leaks can affect the timing accuracy when opening or closing any of the phases of the protected circuit.

While the invention has been described and illustrated with reference to specific embodiments, those skilled in the art will recognize that modification and variations may be made without departing from the principles of the invention as described herein above and set forth in the following claims.

What is claimed:

1. A three phase independent pole operation circuit breaker comprising:

a plurality of switches, each switch being associated with one of the phases of a protected circuit and operatively interfaced with such protected circuit to form a high voltage interface, each said switch having a set of contacts for opening and closing said associated phase of said protected circuit;

an independent pole operation linkage mechanically connected to each switch and being capable of independently opening or closing each switch based on a condition of the protected circuit said linkage comprising a plurality of independent linking elements, each linking element being operatively coupled to one set of contacts to open and close said associated phase; and means for rotationally supporting each of said linking elements;

a driving means having at least two connecting rods, each connecting rod being mechanically interfaced with at least one linking element so that said linking elements rotate independently with respect to each other thereby independently opening and closing said associated phases of said protected circuit; and at least one composite bushing interfaced with said protected circuit and interfaced with each said switch for insulating said high voltage interface.

2. The circuit breaker of claim 1, wherein said composite bushing has a conical shape.

3. The circuit breaker of claim 1, wherein said composite bushing has a plurality of weather sheds formed thereon.

4. The circuit breaker of claim 3, wherein said weather sheds form a helix.

5. The circuit breaker of claim 1, wherein said composite bushing comprises:

a hollow conical tube for containing a gas within the bushing; and an insulative housing having a plurality of weather sheds and substantially covering said hollow conical tube.

6. The circuit breaker of claim 5, wherein said hollow conical tube is made of a fiber reinforced epoxy material.

7. The circuit breaker of claim 5, wherein said housing is made of silicone rubber.

8. The circuit breaker of claim 1, wherein AC current flows in each phase of said protected circuit and said switches are opened and closed synchronously with said AC current.

9. The circuit breaker of claim 1, wherein two composite bushings are provided for each phase of the protected circuit.

10. In a three-phase circuit breaker comprising three interrupters for operatively opening and closing said circuit breaker, each interrupter being associated with one of said three phases; a driving mechanism for generating an initial force to open and close said circuit breaker; and a mechanical linkage for operatively coupling together said interrupters and said driving mechanism, the improvement comprising:

a decoupling and support means for
(i) decoupling said mechanical linkage to form a plurality of independent linking elements therein;
(ii) supporting said linking elements; and,
(iii) permitting each phase of said circuit breaker to be independently opened and closed, said decoupling and support means comprising a bearing through which two of said linking elements form a rotationally decoupled link; and, at least one composite bushing interfaced with each said interrupter for interfacing with a circuit to be protected.

* * * * *